UNITED STATES PATENT OFFICE.

OTTO E. ENELL, OF CHICAGO, ILLINOIS, ASSIGNOR TO THE CHADELOID CHEMICAL COMPANY, OF NEW YORK, N. Y., A CORPORATION OF WEST VIRGINIA.

PAINT AND VARNISH REMOVER.

985,407.    Specification of Letters Patent.    Patented Feb. 28, 1911.

No Drawing.    Application filed February 1, 1907. Serial No. 355,335.

*To all whom it may concern:*

Be it known that I, OTTO E. ENELL, a citizen of the United States, and resident of Chicago, in the county of Cook and State of Illinois, have invented certain new and useful Improvements in Paint and Varnish Removers, of which the following is a specification.

This invention relates to paint and varnish removers and relates especially to compositions comprising volatile solvents with which preferably some waxy bodies and caustic material have been incorporated.

Alcoholic bodies, such as the strict alcohols, also allied ketonic and similar substances allow of the incorporation of caustic alkali, such as potash or the like, which besides tending to decrease their inflammability gives them different solvent powers for some paints and varnishes. The mere mechanical agitation of alcoholic bodies with the proper alkali material is usually sufficient to effect the incorporation of the desired percentage; commercial wood alcohol, for instance, by agitation in a vessel containing a quantity of fused caustic potash in small pieces absorbs several per cent. of the alkali in a short time. A still further reduction of inflammability may be effected by using the desired proportion of carbon tetrachlorid. As the waxy body in such removers, paraffin or preferably ceresin wax may be used and it is desirable also to use a considerable proportion of red oil or crude oleic acid, a saponifiable material which forms a desirable thickener as does also the heavy paraffin oil known as mineral glycerin or slab oil. Both of these oily thickening agents act to give smooth and uniform consistency to the remover and prevent stratification or separation of the various ingredients after they have been combined preferably by agitation at such increase of temperature as is required to thoroughly incorporate the ingredients which besides the alcoholic bodies mentioned usually include a suitable wax solvent such as benzol or its homologues, or other wax solvents such as benzin, turpentine, and so forth.

Illustrative removers of this character may be prepared according to the following formula: wood alcohol, 20 parts, carbon tetrachlorid, 2 parts, caustic potash, about one part, benzol 25 parts, ceresin, 2 parts, oleic acid, 2 parts. Another good remover may comprise commercial acetone from the distillation of wood, 25 parts, caustic potash, about one part, benzol, 20 parts, turpentine, 10 parts, ceresin, 3 parts.

This invention has been described in connection with a number of illustrative ingredients, formulas, proportions and processes, to the details of which disclosure the invention is not, of course, to be limited.

What is claimed is:—

1. The finish remover formed by the incorporation of approximately twenty parts of wood alcohol, two parts carbon-tetrachlorid, one part fused caustic potash, twenty-five parts benzol, two parts ceresin and two parts oleic acid.

2. The finish remover formed by the incorporation of approximately alcohol twenty parts, wax-dissolving finish solvents twenty-seven parts, caustic potash one part, wax two parts and oleic acid two parts.

OTTO E. ENELL.

Witnesses:
HARRY L. DUNCAN,
JESSIE B. KAY.